United States Patent

Oishi et al.

[15] 3,642,485
[45] Feb. 15, 1972

[54] COLOR-PHOTOGRAPHIC SILVER HALIDE MATERIALS CONTAINING COLORED AND UNCOLORED COUPLERS

[72] Inventors: Yasushi Oishi; Yoshinobu Yoshida; Kazuya Sano, all of Kanagawa, Japan

[73] Assignee: Fuji Photo Film Co., Ltd., Kanagawa, Japan

[22] Filed: Aug. 26, 1969

[21] Appl. No.: 853,027

[30] Foreign Application Priority Data

Aug. 26, 1968 Japan..................................43/60991

[52] U.S. Cl..........................................96/100, 96/9, 96/55, 96/66.3, 96/74
[51] Int. Cl..............................................G03c 1/40
[58] Field of Search..................................96/9, 100, 55

[56] References Cited

UNITED STATES PATENTS

| | | | |
|---|---|---|---|
| 2,428,054 | 9/1947 | Vittum et al. | 96/9 |
| 3,006,759 | 10/1961 | Loria et al. | 96/100 |
| 3,034,892 | 5/1962 | Gledhill et al. | 96/100 |

*Primary Examiner*—J. Travis Brown
*Attorney*—Sughrue, Rothwell, Mion, Zinn & Macpeak

[57] ABSTRACT

In a color-photographic material a silver halide emulsion layer thereon contains an azo compound represented by the formula:

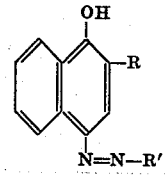

and a phenol or α-naphthol derivative substituted by an iodine atom at the paraposition to the hydroxyl group. The moieties utilized and additional parameters are defined in the specification.

10 Claims, 2 Drawing Figures

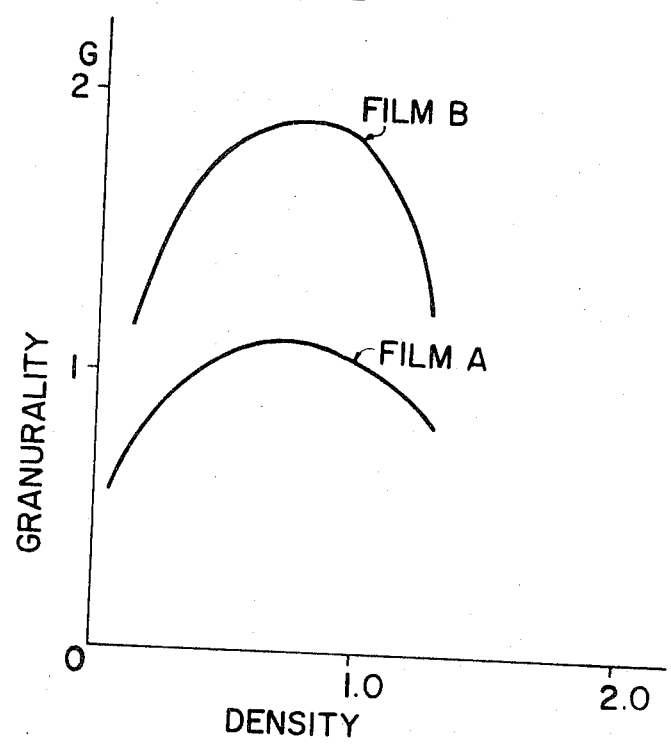

COLOR-PHOTOGRAPHIC SILVER HALIDE MATERIALS CONTAINING COLORED AND UNCOLORED COUPLERS

BACKGROUND OF THE INVENTION

1. Field of the Invention

The present invention relates to color photography, more particularly, to photographic sensitive materials for a color negative having excellent color reproduction and an excellent image quality.

2. Description of the Prior Art

For forming colored photographic images based in the subtractive color process, there are employed couplers capable of forming cyan, magenta, and yellow dyes by a coupling reaction with the oxidation product of a developing agent of the N,N-di-substituted paraphenylene-diamine type which is produced when silver halide particles are reduced by the developing agent.

In order to obtain a cyan dye image using a photographic sensitive material for a color negative in the subtractive color process, a phenol or a naphthol derivative is generally used as the coupler. A cyan color dye image thus formed has a red absorption in a wavelength region of from about 580 m$\mu$ to about 740 m$\mu$. The preferred absorption characteristics for a cyan dye image is that the image has a strong absorption in the aforesaid wave length region, but in the blue and green region lower than 580 m$\mu$ has an absorption as low as possible.

The cyan couplers selected from the phenol or naphthol derivatives, however, which are practically used have considerable absorption in the green and blue regions. These unnecessary absorptions obstruct the normal correspondence of the light-sensitive wavelength of the sensitive elements to the absorption wavelength of the dye image in a color-reproducing system comprising a negative and a positive, and do not give correct color reproduction.

For correcting such a defect in color reproduction, it has been the practice to provide the photographic material with a so-called automasking system. Namely, there are used colored couplers in which the coupling position of the cyan forming coupler has been preliminarily substituted by an azo group to provide absorption in a green region and a blue region. By the reaction of the colored coupler and the oxidation product of a developing agent, the coupler couples to give an indoaniline dye and liberates the azo radical thereof. It is believed that the azo radical is liberated as a diazonium cation.

The liberated product of the azo radical accelerates the development of exposed silver halide particles and also makes possible the development of unexposed silver halide particles under some conditions, although the extent of the action may depend on the structure thereof. Therefore, when development is once initiated, the development is gradually accelerated autocatalytically to provide a high contrast, i.e., to allow only a narrow exposure range. Such a tendency is disadvantageous for light-sensitive materials for a color negative. This tendency also remarkably appears in a photographic emulsion layer containing silver iodobromide of a low iodide content.

Such an autocatalytic development not only deteriorates gradation, but also tends to provide images of poor quality and coarse granularity.

In order to eliminate such an undesirable secondary effect, a compound for inhibiting the development or a so-called development-inhibiting agent is incorporated in an emulsion layer or a developer. However, such a development inhibiting agent exhibits its action uniformly, regardless of the density of images, and thus when the development-inhibiting agent is added in an amount sufficient to inhibit the excessive development at the portions having from middle to high density, the agent exhibits a too strong inhibiting action at the portions having only a low density and reduces development and coupling. This results in lowering the light sensitivity of the color photographic sensitive material.

For obtaining good gradation and excellent image quality by inhibiting excessive development at the portion of high density without reducing the sensitivity of a photographic sensitive material for a color negative containing an automasking system, it is desirable to provide to the emulsion layer a function of automatically inhibiting development in proportion to the density of the images formed, and such means have long been investigated.

SUMMARY OF THE INVENTION

The present invention provides a photographic material which provides excellent color reproduction and excellent image quality.

Basically, the present invention provides as incorporating into a silver halide emulsion layer of a color photographic material a diffusion-fast or ballasted phenol or $\alpha$-naphthol derivative of which the para-position to the hydroxyl group has been substituted by an iodine atom. This compound is utilized in combination with a ballasted color coupler such as an azo derivative.

Both of the above compounds must contain a hydrophobic group having 8–30 carbon atoms.

BRIEF DESCRIPTION OF THE DRAWINGS

FIG. 2 is a plot of granularity versus density for two different films.

DETAILED DESCRIPTION OF THE PREFERRED EMBODIMENTS

Figure 1:
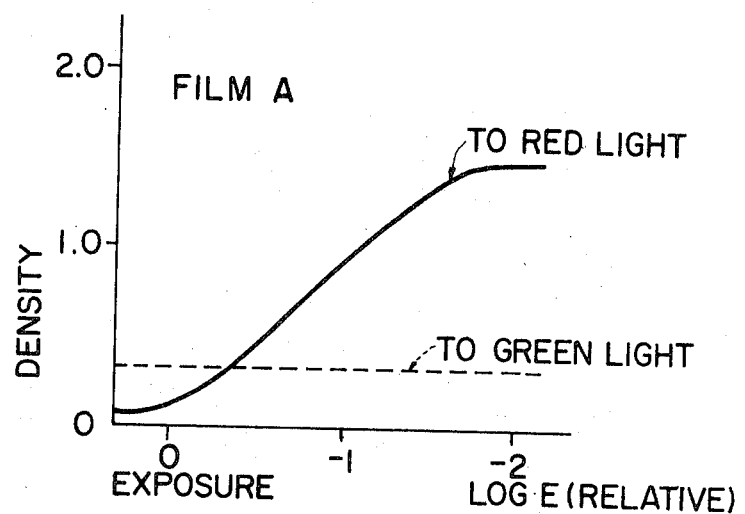
FIG. 1 is a plot of exposure versus density for two films varying light conditions.
Figure 1:
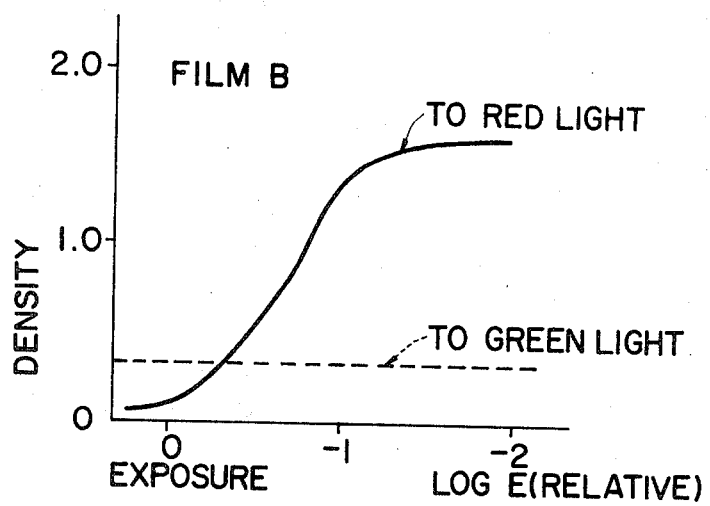

The present inventors have found that by using a diffusion-fast or ballasted phenol or $\alpha$-naphthol derivative of which the paraposition to the hydroxyl group has been substituted by an iodine atom, together with a ballasted colored coupler such as a ballasted 1-hydroxy-4-azo-naphthalene derivative, a good gradation and a good image quality suitable for a color negative can be obtained without a bad influence on the formation of automasks.

The phenol or naphthol derivative substituted by an iodine atom used in the present invention is colorless, provides a cyan dye by the reaction with the oxidation product of a color developing agent and liberates iodide ions. In order that said compound can be fixed in an emulsion layer in which the compound has been incorporated and diffuses into the adjacent layers, it is necessary that the compound have at least one hydrophobic group having more than eight carbon atoms in the molecule. The hydrophobic group associates a number of coupler molecules into a micelle or an oil droplet which is enough large to migrate through the gelatin network.

The phenol or naphthol derivative substituted by an iodine atom used in the present invention may be selected from the compounds represented by the following formulas:

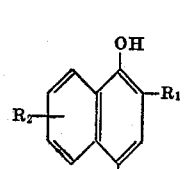
Formula I

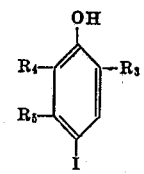
Formula II wherein $R_1$ represents a substituted carbamoyl group, an acrylamino group, a substituted ureido group, or a substituted benzimidazole group, each of said groups having a hydrophobic group having more than eight carbon atoms; $R_2$ represents a hydrogen atom, a halogen, a nitro group, a carboxyl group, a sulfone group, an acylamino group, an unsubstituted or substituted carbamoyl group, an alkyl group or an alkoxyl group; $R_3$ represents an acylamino group, a substituted carbamoyl group, or a substituted ureido group, each of said groups having a hydrophobic group having more than eight carbon atoms; and $R_4$ and $R_5$ each represents a hydrogen atom, an alkyl group or an alkoxy group.

Some examples of the iodine-substituted cyan-forming couplers used in the present invention are illustrated below:

(J-1) 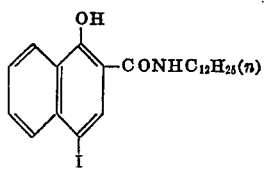

(J-2) 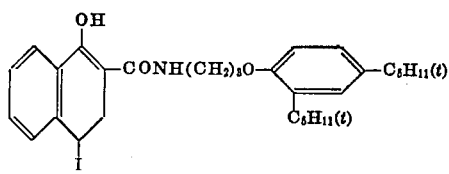

(J-3) 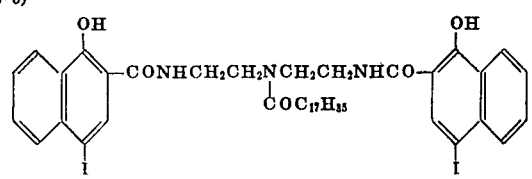

(J-4) 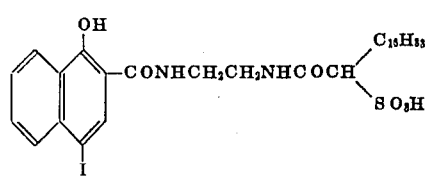

(J-5) 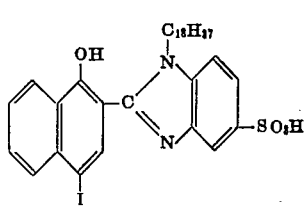

(J-6) 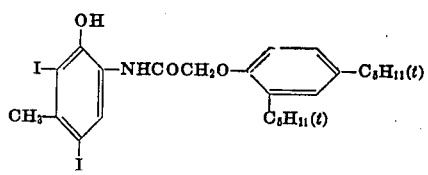

(J-7) 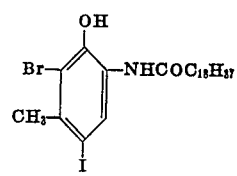

The automasking colored coupler used in the present invention is an α-naphthol of which the 4 position has been substituted with an arylazo group or a heteroazo group, has absorption corresponding to the cyan color image in the green and blue region, and also forms an indoaniline cyan dye by the reaction with the oxidation product of a color developing agent. In order that the colored coupler is fixed in a photographic emulsion layer in which the coupler has been incorporated and is not diffused into the adjacent emulsion layers, the coupler must have at least one hydrophobic group having more than eight carbon atoms in the molecule. The colored coupler preferably used in the present invention may be selected from the compounds represented by the following general formula:

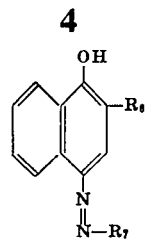

wherein $R_6$ represents a substituted carbamoyl group, an acylamino group, a substituted ureido group, or an unsubstituted ureido group and $R_7$ represents an aryl group and a heterocyclic group, said $R_6$ and/or $R_7$ having at least a hydrophobic group having more than eight carbon atoms.

Some preferred examples of the colored couplers and the examples of preparing them are shown in the specifications of Japanese Pat. Publication Nos. 20591/66, 11304/67, 3281/65 and 5664/65; British Pat. Nos. 1,043,044 and 1,067,397: and U.S. Pat. Nos. 2,860,975, 2,706,684, 2,725,292 and 3,034,892.

Some examples of the compounds used in the present invention are shown below (M-1) 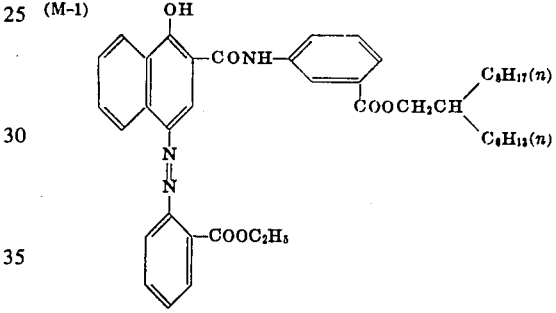

(M-2) 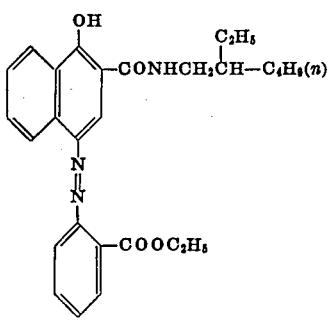

(M-3) 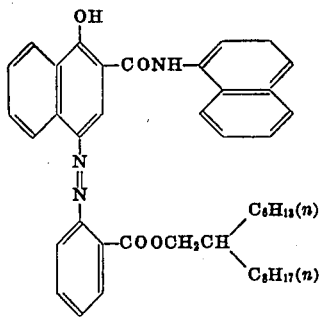

(M-4)
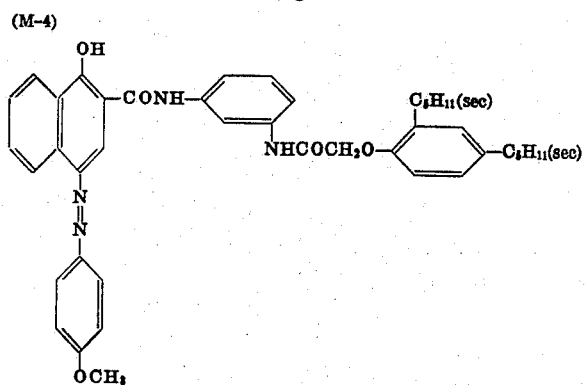

(M-5)
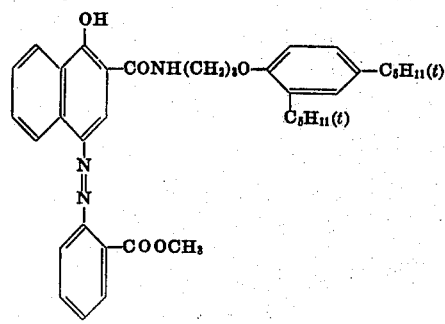

(M-6)
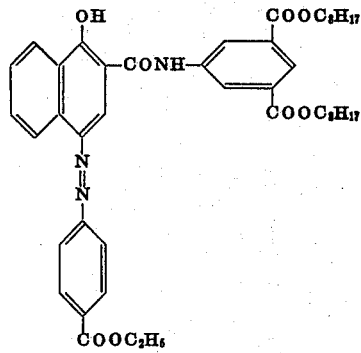

(M-7)
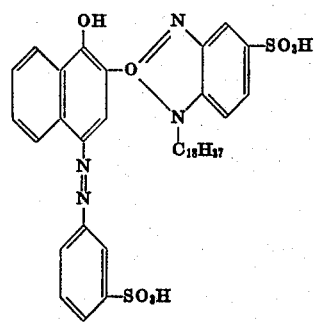

(M-8)
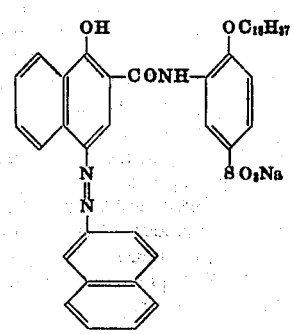

(M-9)
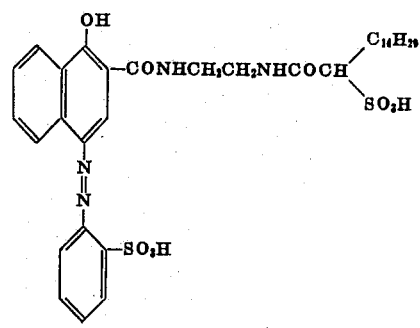

(M-10)
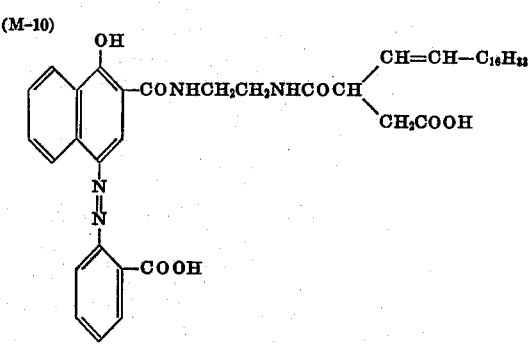

(M-11)
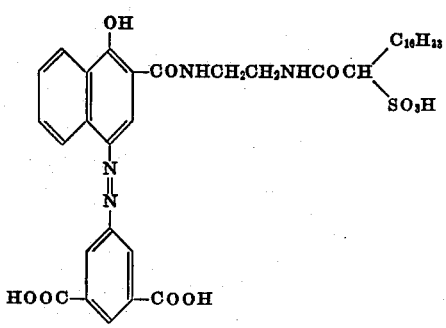

(M-12)
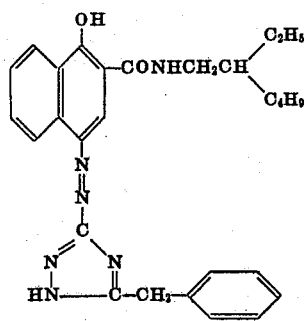

The iodine-substituted coupler and the colored coupler used effectively in the light-sensitive materials of the present invention may be a hydrophilic coupler having a water-solubilizing group such as a carboxyl group or a sulfone group in the molecule or an oil-soluble coupler without such water-solubilizing group. The former type of coupler is mainly added to an emulsion in an aqueous solution, while the latter type of coupler is added in an oily solution.

The photographic emulsion used in the present invention preferably contains silver iodobromide as the sensitive element, and in particular a silver iodobromide emulsion containing less than 10 mol percent iodide, which gives the aforesaid excellent photographic properties and color reproduction without reducing the light sensitivity when the emulsion is used together with a combination of the iodine-substituted coupler and the colored coupler mentioned above.

The iodine-substituted cyan-forming coupler used in the present invention may be prepared by directly iodizing a corresponding phenol or a corresponding α-naphthol derivative or may be prepared from a corresponding p-aminophenol or p-aminonaphthol by the Sandmeyer reaction.

As an example thereof, the preparation of 1-hydroxy-4-iodo-N-n-dodecyl-2-naphthamide (J-1) is illustrated below.

In 500 ml. of glacial acetic acid were suspended 70 g. of 1-hydroxy-N-n-dodecyl-2-naphthamide, 28 g. of sodium acetate and 35 g. of anhydrous lead acetate. The mixture was heated to 70°–80° C. with stirring and while exposing the system to sunlight, a saturated methanol solution of 50 g. of iodine was added dropwise to the system over a 3 hour period. After further continuing the reaction for 1 hour, the product was filtered and the filtrate was allowed to stand in a cool place to give a precipitate, which was collected by filtration, recrystallized twice from acetone and dried sufficiently to provide 32 g. of the iodonapthamide having a melting point of 93°–94° C.

Other iodine-substituted couplers may be prepared by processing corresponding phenol or naphthol derivatives with the methanol solution of iodine as above.

The color photographic sensitive material of the present invention provides a color negative suitably color-masked and having proper gradation and fine graininess. Furthermore, from the color negative prepared according to the present invention, a color print can be obtained with excellent color rendition and graininess.

The exposed silver halide grains are developed by a p-phenylenediamine-type developing agent to give the oxidation product of the developing agent which reacts simultaneously with the iodine-substituted coupler and with the colored coupler to provide cyan dyes. From the former, an iodide ion is liberated, and from the latter, a diazonium ion is liberated. These ions exhibit the effect of inhibiting and that of accelerating the development, respectively. By a proper balance of these effects, the progress of development is suitably controlled to provide a suitable gradation and excellent graininess.

Moreover it is sometimes more preferable to employ, besides the iodine-substituted and the colored couplers, a cyan-forming coupler wherein the coupling position has not been substituted with a chlorine atom, bromine atom or a sulfone group. Some examples of such cyan-forming couplers are as follows:

(C-1) 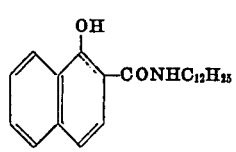

(C-2) 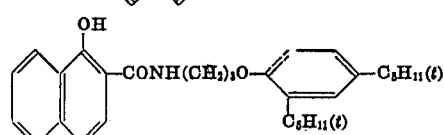

(C-3) 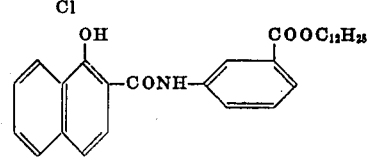

(C-4) 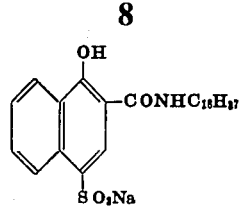

(C-5) 

(C-6) 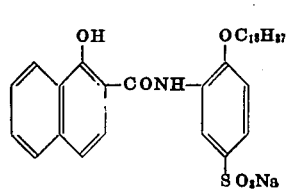

(C-7) 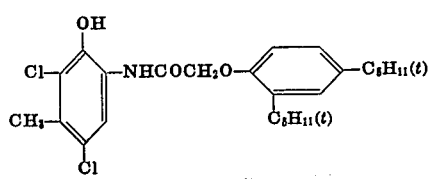

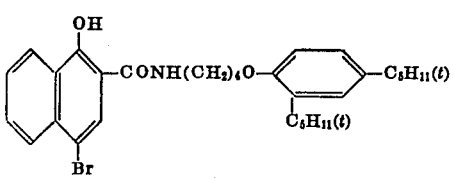

Some examples of practices of the present invention will be described below.

EXAMPLE 1

The following two kinds of photographic films were prepared:

Emulsion A: A solution prepared by heating to 65° C. 0.60 g. of a colored coupler having the aforesaid structure (M-2), 1.8 g. of the iodine-substituted coupler of the formula (J-1), 3.5 ml. of tri-o-cresyl phosphate, and 5.0 ml. of ethyl acetate was poured in 50 ml. of an aqueous solution containing 0.25 g. of sodium dodecylbenzene sulfonate and 3.5 g. of gelatin, and the mixture was emulsified by vigorously agitating for 20 minutes by means of a high-speed mixer.

Emulsion B: A solution prepared by heating to 65° C. 0.60 g. of a colored coupler having the aforesaid structure (M-2), 1.5 g. of the cyan-forming coupler having the structure (C-1), 3.5 ml. of tri-o-cresyl phosphate, and 5.0 ml. of ethyl acetate was poured in 50 ml. of an aqueous solution containing 0.25 g. of sodium dodecylbenzene sulfonate and 3.5 g. of gelatin and the mixture was emulsified by agitating vigorously for 20 minutes by means of a high-speed mixer.

Film A: The whole amount of Emulsion A prepared above was added to 200 g. of a red-sensitive emulsion containing $7.4\times10^{-B\&2}$ mols of silver iodobromide having a silver-iodine content of 3.5 mols and 13 g. of gelatin. After adding 5 ml. of a 3 percent acetone solution of triethylene phosphoramide as a hardening agent, the resulting emulsion was applied to a cellulose triacetate film to a dry thickness of 5 microns. Film B: The film was prepared by using Emulsion B in the same procedure as described above.

The photographic films prepared above were exposed sensitometrically using an optical wedge and processed as follows:

| Process | Temperature | Time |
|---|---|---|
| 1. Color development | 21° C. | 12 min. |
| 2. Washing | 18° C. | 1 min. |
| 3. First fixing | 21° C. | 4 min. |
| 4. Washing | 18° C. | 3 min. |
| 5. Bleaching | 21° C. | 3 min. |
| 6. Washing | 18° C. | 3 min. |
| 7. Second fixing | 21° C. | 3 min. |
| 8. Washing | 18° C. | 15 min. |

The composition of the color developer used for the color development was as follows:

| Color developer | Amount |
|---|---|
| Water | 1,000 ml. |
| Benzyl alcohol | 4.0 ml. |
| Sodium hexamethaphosphate | 2.0 g. |
| Sodium sulfite (anhydrous) | 2.0 g. |
| 4-amino-N-ethyl-N($\beta$-methan-sulfonamidoethyl)-m-toluidine sesquisulfate | 5.0 g. |
| Potassium bromide | 1.0 g. |
| Sodium carbonate (monohydrate) | 50 g. |

The characteristic curves of Film A and Film B thus processed and measured using red and green light are shown in FIG. 1 of the accompanying drawings.

These two films had almost the same inertia sensitivity, maximum density and masking characteristics to green light. However, Film A (containing the iodine-substituted coupler according to the present invention) had a characteristic curve of good linearity and a wide exposure range, whereas Film B (having a conventionally known composition), had a characteristic curve of poor linearity at its high density portion, and a narrow exposure range.

Film A showed a broader latitude for exposure than Film B. Also, when photographic prints were prepared from negatives onto a color positive film, a print from Film A showed better color rendition than Film B.

The uniformly exposed and processed portions of the films were scanned by microdensitometry using red light to measure the Selwyne's granularity, the results of which are shown in FIG. 2.

It is clear from the above results that Film A of this invention showed finer granularity, in particular in the middle-density range, than Film B having the known composition.

EXAMPLE 2

An aqueous gelatin solution containing a black silver colloid was applied to a cellulose triacetate film to a dry thickness of 2 microns as an antihalation layer.

To 800 g. of a red-sensitive photographic emulsion containing 0.11 mol of silver iodobromide having a content of 5.2 mol percent silver iodide were added 25 ml. of a 5 percent aqueous alkaline solution of the colored coupler of the structure (M-9), 21 ml. of a 5 percent aqueous alkaline solution of the cyan-forming coupler of the structure (C-5), and 50 ml. of a 5 percent aqueous alkaline solution of the iodine-substituted coupler of the structure (J-4). After adjusting the pH of the above-prepared emulsion to 6.5 by a 3 normal phosphoric acid solution and adding thereto 12 ml. of a 3 percent acetone solution of triethylene phosphoramide as a hardening agent, the resulting emulsion was applied to the antihalation layer formed above to a dry thickness of 4 microns. To the emulsion layer thus formed was applied an aqueous gelatin solution containing fine silver bromide grains having low photosensitivity to a thickness of 1.5 microns as an intermediate layer.

To the intermediate layer thus formed was further applied a green-sensitive emulsion containing the magenta-forming coupler and the colored coupler having the following formulas to a thickness of 4.5 2

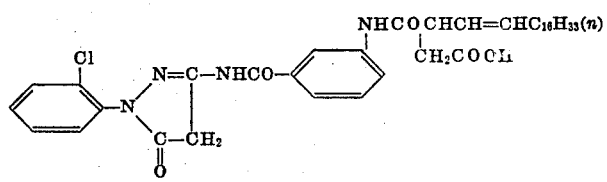

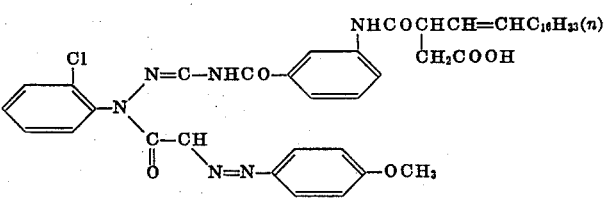

Furthermore, to the emulsion layer there was applied a gelatin solution containing a yellow silver colloid to a thickness of 1.5 microns as a yellow filter, and further thereto there was applied a blue-sensitive emulsion containing the yellow-forming coupler having the following structure to a thickness of 5 microns:

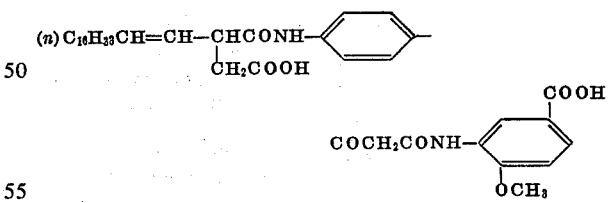

When the light-sensitive film for color negative thus prepared was subjected to the developing procedures of Example 1 after exposure, the photographic film showed an excellent color reproduction as well as excellent gradation to red exposure and a very fine granularity.

EXAMPLE 3

An aqueous gelatin solution containing a black silver colloid was applied to a cellulose triacetate film to a dry thickness of 3 microns as an antihalation layer.

A solution obtained by heating a mixture of 1.8 g. of the colored coupler of the structure (M-3), 2.6 g. of the iodine-substituted coupler of the structure (J-2), 1.8 g. of the cyan-forming coupler of the structure (C-1), and 10 ml. of di-n-butylphthalate was added to an aqueous solution containing 10 g. of gelatin and 0.7 g. of sodium dodecylsulfate with stirring at 50° C. The mixture was passed through a colloid mill 5 times to finely disperse the couplers.

All of the dispersion was added to 500 g. of a red-sensitive emulsion containing 0.18 mol of silver iodobromide having an iodide content of 7.8 mol percent and 35 g. of gelatin. After adding thereto 12 ml. of a 3 percent acetone solution of triethylene phosphoramide, the resulting emulsion was applied to the antihalation layer formed above to a dry thickness of 5.5 microns. To the emulsion layer, there was further applied a gelatin solution (containing fine silver bromide grains having low photosensitivity) to a thickness of 1.5 microns. This served as an intermediate layer.

To the intermediate layer there was applied a green-sensitive emulsion containing the magenta-forming coupler having the following formula to a thickness of 5 microns:

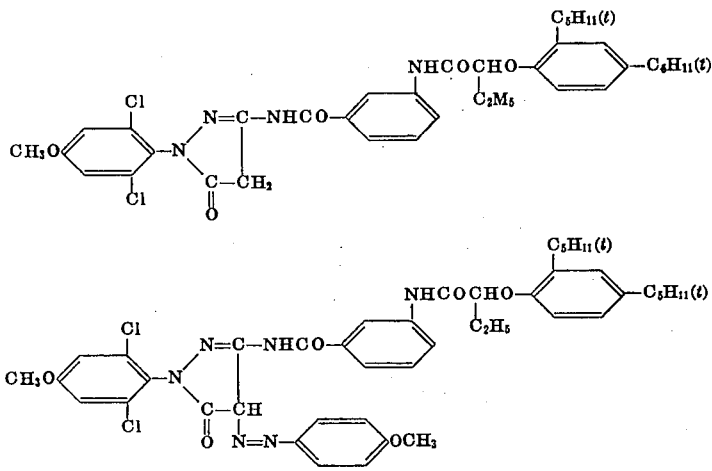

Furthermore, there was applied thereon a gelatin solution containing a yellow silver colloid as a yellow filter layer to a thickness of 1.5 microns. To the filter layer there was further applied a blue-sensitive emulsion containing the yellow-forming coupler having the following structure to a thickness of 6 microns:

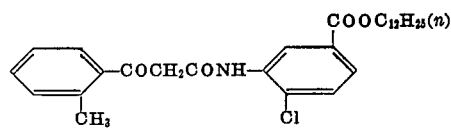

Finally, to the blue-sensitive emulsion layer there was applied a gelatin solution in a thickness of 1.5 microns as a protective layer, thereby providing a light-sensitive film for a color negative.

When the color photographic film thus prepared was exposed and developed as in Example 1, the photographic film showed good color reproduction and had an excellent gradation to red exposure and very fine granularity.

A color print was prepared by printing on a color-print paper the enlarged image of the color-negatives thus obtained. The color print showed brilliant color images and excellent image structure with a fine graininess, particularly in the red portions thereof.

To further illustrate some of the preferred embodiments of the present invention, the ratio of the iodine substituted compound to the azo compound is most preferably within the range 0.2-5.

In the most preferred embodiment, $R_1$ is a carbamoyl, acylamino ureido or benzimidazole group containing a hydrophobic group having 8–30 carbon atoms. Among the many embodiments of $R_2$, the alkyl group should most preferably have one to five carbon atoms.

In claim 1, it is most preferred that the substituted carbamoyl group be a carbamoyl group per se.

In the embodiments of both claims 1 and 2, etc., it is most preferred that the hydrophobic group be an alkyl, alkenyl or alkylaryl group having 8–30 carbon atoms.

What is claimed is:

1. A color photographic sensitive material comprising a support having thereon a silver halide emulsion layer containing (1) an azo compound represented by the formula:

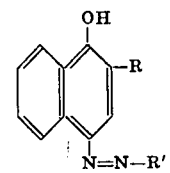

wherein R represents a carbamoyl group having five to 30 carbon atoms and R' represents an aryl or a heterocyclic group, at least one of said R and R' containing a hydrophobic group having eight to 30 carbon atoms, and (2) a phenol or α-naphthol derivative substituted by an iodine atom at the paraposition to the hydroxyl group and having at least one hydrophobic group containing eight to 30 carbon atoms, said hydrophobic group being an alkyl, alkenyl or alkaryl group.

2. The color photographic sensitive material as claimed in claim 1 in which said phenol or α-naphthol derivative is a compound having the formula:

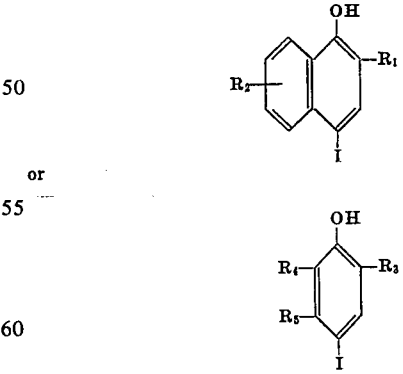

wherein $R_1$ represents a member selected from the group consisting of a carbamoyl group, an acylamino group, a ureido group, and a benzimidazole group and contains an alkyl, alkenyl or aralkyl hydrophobic group having 8 to 30 carbon atoms, $R_2$ represents a member selected from the group consisting of a hydrogen atom, a halogen atom, a nitro group, a carboxyl group, a sulfo group, an acylamino group, a carbamoyl group, an alkyl group having one to five carbon atoms, and an alkoxyl group, $R_3$ represents a member selected from the group consisting of an acylamino group, a carbamoyl group and a ureido group and contains a hydrophobic group having eight to 30 carbon atoms, and $R_4$ and $R_5$ each represents a member selected from the group consisting of a hydrogen atom, a halogen atom, an alkyl group and an alkoxyl group.

3. The color photographic sensitive material as claimed in claim 1 in which said azo compound is a member selected from the group consisting of a 1-hydroxy-4-acyl-phenylazo-2-naphthamido derivative and a 1-hydroxy-4-acyloxy-phenylazo-2-naphthamido derivative.

4. The color photographic sensitive material as claimed in claim 1 in which said silver halide emulsion layer contains silver iodobromide of an iodide content less than 10 mol percent.

5. The color photographic sensitive material as claimed in claim 1 in which said silver halide emulsion layer contains, in addition to said azo compound and said phenol or naphthol derivative, a 1-hydroxy-2-naphthamido derivative which has a hydrophobic radical containing eight to 30 carbon atoms in the 2 position and is substituted in the 4 position by a member selected from the group consisting of a hydrogen atom, a chlorine atom, a bromine atom and a sulfo group.

6. The color photographic sensitive material as claimed in claim 1 in which said α-naphthol derivative is represented by the formula:

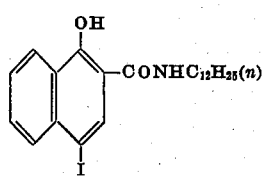

7. The color photographic sensitive material as claimed in claim 1 in which said α-naphthol derivative is represented by the formula:

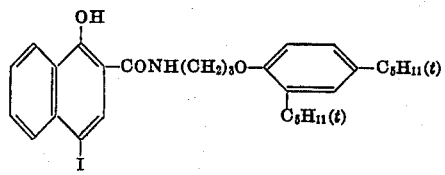

8. The color photographic sensitive material as claimed in claim 1 in which said α-naphthol derivative is represented by the formula:

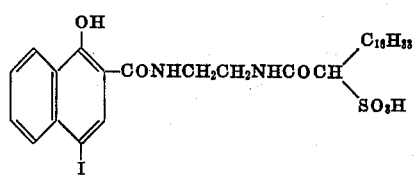

9. The color photographic sensitive material of claim 1, wherein the ratio of the iodine substituted phenol or α-naphthol derivative with respect to said azo compound ranges from 0.2 to 5.0.

10. A color photographic sensitive material comprising a support having thereon, a silver halide emulsion layer containing:

1. an azo compound represented by the formula:

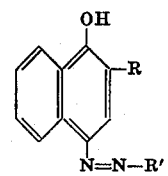

wherein R represents a carbamoyl group having five to 30 carbon atoms and R' represents an aryl or a heterocyclic group, at least one of said R and R' containing a hydrophobic group having eight to 30 carbon atoms, and 2 a phenol or α-naphthol derivative substituted by an iodine atom at the paraposition to the hydroxyl group and having at least one hydrophobic group containing eight to 30 carbon atoms, said hydrophobic group being an alkyl, alkenyl or alkrayl group, and 2. a phenol or α-naphthol derivative of the formula:

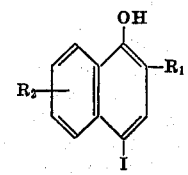

or

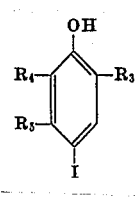

wherein $R_1$ represents a member selected from the group consisting of a carbamoyl group, an acylamino group, a ureido group, and a benzimidazole group and contains an alkyl, alkenyl or aralkyl hydrophobic group having eight to 30 carbon atoms, $R_2$ represents a member selected from the group consisting of a hydrogen atom, a halogen atom, a nitro group, a carboxyl group, a sulfo group, an acylamino group, a carbamoyl group, an alkyl group having one to five carbon atoms, and an alkoxyl group, $R_3$ represents a member selected from the group consisting of an acylamino group, a carbamoyl group and a ureido group and contains a hydrophobic group having eight to 30 carbon atoms, and $R_4$ and $R_5$ each represents a member selected from the group consisting of a hydrogen atom, a halogen atom, an alkyl group and an alkoxyl group, the ratio between said iodine substituted phenol or α-naphthol derivative and said azo compound ranging from 0.2 to 5.0.

* * * * *